United States Patent
Persson

(10) Patent No.: US 11,833,639 B2
(45) Date of Patent: Dec. 5, 2023

(54) ARRANGEMENT FOR GRINDING EDGED TOOLS

(71) Applicant: Tormek AB, Lindesberg (SE)

(72) Inventor: Håkan Persson, Lindesberg (SE)

(73) Assignee: Tormek AB, Lindesberg (SE)

( * ) Notice: Subject to any disclaimer, the term of this patent is extended or adjusted under 35 U.S.C. 154(b) by 0 days.

(21) Appl. No.: 18/186,121

(22) Filed: Mar. 17, 2023

(65) Prior Publication Data

US 2023/0226657 A1 Jul. 20, 2023

Related U.S. Application Data

(63) Continuation of application No. 16/839,168, filed on Apr. 3, 2020, now Pat. No. 11,628,536.

(30) Foreign Application Priority Data

Apr. 5, 2019 (SE) .................................. 1950423-2

(51) Int. Cl.
| | |
|---|---|
| *B24B 41/06* | (2012.01) |
| *B24B 3/54* | (2006.01) |
| *B23Q 3/06* | (2006.01) |
| *B24B 27/02* | (2006.01) |

(52) U.S. Cl.
CPC .............. *B24B 41/066* (2013.01); *B24B 3/54* (2013.01); *B23Q 3/06* (2013.01); *B23Q 2703/02* (2013.01); *B23Q 2703/12* (2013.01); *B24B 27/02* (2013.01)

(58) Field of Classification Search
CPC .......... B24B 41/066; B24B 3/54; B24B 27/02
See application file for complete search history.

(56) References Cited

U.S. PATENT DOCUMENTS

| | | | |
|---|---|---|---|
| 1,770,538 A | | 7/1930 | Warner |
| 1,831,863 A | * | 11/1931 | Irwin .................... B24B 23/024 |
| | | | 451/349 |
| 2,191,600 A | * | 2/1940 | Wahl ........................ B24B 3/52 |
| | | | 451/224 |
| 2,638,720 A | | 5/1953 | Hoek |

(Continued)

FOREIGN PATENT DOCUMENTS

| | | |
|---|---|---|
| CN | 2723106 | 9/2005 |
| EP | 0214943 | 3/1987 |

(Continued)

OTHER PUBLICATIONS

European Search Report for EP Application No. 20167311.8 dated Sep. 7, 2020 (8 pages).

(Continued)

*Primary Examiner* — Tyrone V Hall, Jr.
(74) *Attorney, Agent, or Firm* — Knobbe Martens Olson & Bear LLP

(57) ABSTRACT

An arrangement (50) for grinding edged tools, such as knives, said arrangement (50) configured to be part of a grinding machine (100), comprising a conical grinding wheel (110) arranged to be rotated in a rotational direction (R) and having an envelope grinding surface (111) for an edged tool (10), and a grinding jig (120) for holding an edged tool (10), wherein the grinding jig (120), in use, is arranged such that the edged tool (10) extends over the envelope grinding surface (111) perpendicular to the rotational direction (R).

18 Claims, 3 Drawing Sheets

(56) References Cited

U.S. PATENT DOCUMENTS

| | | | |
|---|---|---|---|
| 2,898,709 | A | 8/1959 | Bednarski |
| 3,543,446 | A | 12/1970 | Kilian |
| 3,800,632 | A | 4/1974 | Juranitch |
| 4,320,892 | A | 3/1982 | Longbrake |
| 4,338,749 | A | 7/1982 | Kiser |
| 7,033,247 | B2 | 4/2006 | Zhang et al. |
| 7,488,241 | B2 | 2/2009 | Elek et al. |
| 9,073,166 | B2 | 7/2015 | Fujimura |
| RE46,941 | E | 7/2018 | Jansson |
| 2005/0048885 | A1 | 3/2005 | Longbrake |
| 2005/0250429 | A1* | 11/2005 | Nomoto ............... B24D 7/18 451/359 |
| 2006/0258271 | A1 | 11/2006 | Naples |
| 2011/0034111 | A1 | 2/2011 | Eleck et al. |
| 2011/0177764 | A1 | 7/2011 | Schwartz |
| 2013/0295825 | A1 | 11/2013 | Persson |
| 2015/0165582 | A1* | 6/2015 | Persson ............... B24B 27/02 451/369 |
| 2017/0113323 | A1 | 4/2017 | Persson |
| 2019/0255673 | A1 | 8/2019 | Persson |

FOREIGN PATENT DOCUMENTS

| | | |
|---|---|---|
| EP | 1987916 | 11/2008 |
| EP | 2324953 | 5/2011 |
| EP | 2660005 | 11/2013 |
| EP | 2883655 B1 | 6/2015 |
| JP | 2005193317 A | 7/2005 |
| SE | 538902 C2 | 1/2017 |
| WO | WO 2016195572 A1 | 12/2016 |

OTHER PUBLICATIONS

Swedish Office Action for Swedish Application No. 1950423-2 dated Sep. 23, 2019 (8 pages).
European Search Report for EP Application No. 20165128 dated Sep. 4, 2020 (8 pages).
Swedish Office Action for Swedish Application No. 1950422-4 dated Sep. 19, 2019 (8 pages).
Communication pursuant to Article 94(3) EPC for European Application No. 20 167 311.8 dated Feb. 10, 2022.
Extended European Search Report dated Sep. 21, 2023 in EP Application No. 23173826.1 in 8 pages.

* cited by examiner

ARRANGEMENT FOR GRINDING EDGED TOOLS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. For example, this application is a continuation of U.S. application Ser. No. 16/839,168, entitled "ARRANGEMENT FOR GRINDING EDGED TOOLS" and filed on Apr. 3, 2020, which claims priority to Sweden Application No. 1950423-2 entitled "AN ARRANGEMENT FOR GRINDING EDGED TOOLS" and filed on Apr. 5, 2019, the entire disclosure of each of which is incorporated herein by reference for all purposes and forms a part of this specification.

BACKGROUND

Field

The present disclosure relates to an arrangement for grinding edged tools, such as knives. The arrangement is configured to be part of a grinding machine. Typically, the grinding machine is of the bench-type. Thus, the grinding machine may be of dimensions such that it may be placed on a table in a workshop and to be operated manually by a person.

Description of the Related Art

Sharpening of edged tools, such as knives are typically made in grinding machines with rotating grindstones. The grindstones are typically constituted by a circular disc of abrasive material where the edge of the tool, such as a knife, is sharpened against the cylindrical outer surface of the grindstone. However, a drawback with this type of grinding machines is that the bevels of the edge of the blade, after sharpening, may have a slight concave profile. This reduces the strength of the blade. The concaveness of the blade tend to increase with reduced diameter of the grindstone.

U.S. Pat. No. 2,638,720 shows a conventional grinding machine which comprises a conical grindstone 22 and a grinding jig in the form of two shoes 30, 31. The two shoes 30, 31 guide the blade 50 of a knife in a translating movement across the conical surface of the grindstone 22. However, a problem associated with US'720 is that over time, wear of the grindstone will result in that the grindstone attains a chambered profile. This defect is especially disadvantageous when the grindstone is used in combination with a grinding jig because it causes misalignment between the grinding jig (and thus the blade to be ground) and surface of the grindstone. The result will be that the edge of the blade is unevenly ground.

Thus, it is an object of the present disclosure to provide an arrangement for grinding edged tools which achieves strong and planar edges of edged tools after grinding.

A further object of the present disclosure is to provide an improved grinding machine for grinding edged tools.

SUMMARY

According to the present disclosure, at least one of these objects are met by an arrangement for grinding edged tools, such as knives, said arrangement configured to be part of a grinding machine, said arrangement comprising a conical grinding wheel arranged to be rotated in a rotational direction (R) and having an envelope grinding surface for an edged tool, and a grinding jig for holding an edged tool, wherein the grinding jig, in use, is arranged such that the edged tool extends over the envelope grinding surface perpendicular to the rotational direction (R). The grinding wheel may be made of metal with a super-abrasive coating.

Surprisingly, it has shown that the bevels of an edge that is sharpened in a grinding machine having an arrangement for grinding edged tool according to the present disclosure are substantially less concave in comparison to the bevels of an edge that is ground in grinding machines with cylindrical grindstones. That is, the curve of the less concave bevel is more shallow. This increases the strength and thus both efficiency and the life-length of the edge. It is believed that conventional grindstones with cylindrical grinding surfaces produces concave edge bevels where the concavity is approximately equal to radius of the grindstone. In the grinding machine according to the present disclosure on the other hand, grinding of the edges is performed on the envelope surface of the conical grinding wheel and perpendicular to the direction of rotation. This provides a grinding surface which is substantially flat, that and causes thereby little or no concavity of the bevels of the edge. In addition, it has shown that the grinding wheel of the arrangement according to the present disclosure maintains it original shape, with no or little tendency to chambering. This is turn provides for strong and planar edge bevels of edged tools ground in the arrangement of the present disclosure. Even when the arrangement according to the present disclosure has been use for a long time.

Preferably, the grinding wheel is frusto-conical, i.e. a truncated cone. This makes possible to achieve a grinding wheel that occupies little space and has a substantially flat grinding surface.

Advantageously, the arrangement for grinding edged tools comprises a support for holding the grinding jig adjacent the envelope grinding surface. The support comprises a first support arm which may be attached to a housing of a grinding machine and extends outward from the housing, at the side of the grindstone. The support further comprises a second support arm which extends from the first support arm parallel to the envelope surface of the grindstone. The grinding jig is supported on the second support arm such that the edge of an edged tool, i.e. a bevel of the edge of the edged tool, may be placed in contact with the envelope grinding surface and oriented perpendicular to the direction of rotation of the grinding wheel. This provides a well working solution for placing the edge of the edged tool in correct position relative the grinding surface.

Preferably, the grinding jig comprises a clamp for holding the edged tool, the clamp may comprise a first and a second branch joined by a bend. Advantageously, the first and the second branch extends laterally parallel with the grinding surface and perpendicular to the rotation direction. This ensures that the edge of the edged tool, in use of the grinding machine, are positioned perpendicular to the rotation direction of the grinding wheel.

According to a second aspect of the present disclosure, at least one of the aforementioned objects are met by a grinding machine for grinding edged tools, such as knives, comprising a housing with a base for supporting the grinding machine on a surface, a grinding wheel with a grinding surface and a motor for rotating the grinding wheel in a rotational direction (R), characterized in that the grinding wheel is conical and arranged such that the envelope surface of the conical grinding wheel forms grinding surface, wherein the grinding wheel is optionally made of metal with a super-abrasive coating. The grinding machine may comprise a grinding jig for holding an edged tool, wherein the grinding jig, in use, is arranged such that the edged tool extends over the grinding surface perpendicular to the rotational direction (R).

In an alternative of the present disclosure, the grinding machine comprises a lift handle arranged in a top portion of a housing of the grinding machine and extending between a front and rear side of said housing. This simplifies the use of the grinding machine since the grinding machine easily may be picked up and moved from one place to another.

DETAILED DESCRIPTION

The arrangement for grinding edged tools according to the present disclosure and a grinding machine comprising such arrangement will now be described more fully hereinafter. The arrangement for grinding edged tools and the grinding machine according to the present disclosure may, however, be embodied in many different forms and should not be construed as limited to the embodiments set forth herein; rather, these embodiments are provided by way of example so that this disclosure will be thorough and complete, and will fully convey the scope of the present disclosure to those persons skilled in the art. Like reference number refer to like elements throughout the description. The term "grinding wheel" may also be referred to as "grindstone".

Figure 1:
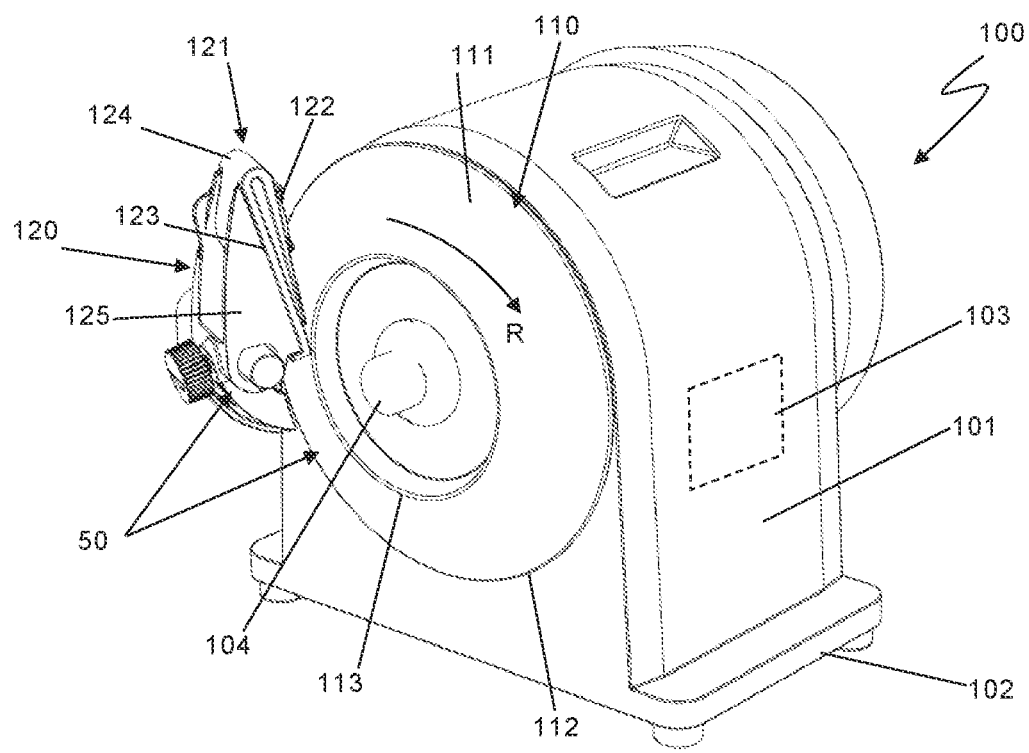
FIG. 1 is a perspective view from the left of a grinding machine according to a first alternative of the present disclosure.

FIG. 1 shows schematically a grinding machine 100 according to a first alternative of the present disclosure. The grinding machine 100 comprises an arrangement 50 for grinding edged tools 10 according to a first alternative of the present disclosure. The grinding machine 100 is of the bench type, i.e. it is of dimensions such that it may be placed on a table in a workshop and to be operated manually by a person. The grinding machine 100 is not to be confused with handheld grinding machines, such as angular grinders or industrial large scale types of grinding machines.

The grinding machine is configured for grinding edged tools, such as knives. The grinding machine 100 comprises a housing 101 with a base 102 for supporting the grinding machine on a surface, such as a table or workbench (not shown). The housing 101 may be made in hard plastic and encloses a motor 103 for rotating a grinding wheel 110 in a rotational direction R. The motor may be an electrical motor, and is connected to an output shaft 104 which runs through the center of the grinding wheel 110. The housing 101 may also enclose electrical wiring and circuits (not shown) for controlling the motor 103. For example the grinding machine may be T-2 grinding machine, commercially available from the company Tormek AB.

According to a first alternative of the present disclosure, the arrangement 50 for grinding edged tools 10 comprises a conical grinding wheel 110. That is, the circular base 112 of the grinding wheel 110, which faces the housing 101 has lager diameter than the top 113, which faces away from the housing 101. The envelope surface 111 of the conical grinding wheel extends between the base 112 and the top. The envelope surface 111 forms the grinding surface of the grinding wheel 110.

The grinding wheel 110 may be frusto-conical as shown in FIG. 1. The inclination of envelope surface 111 may be 25°.

The grinding wheel may be made of metal such as steel with a super abrasive coating. The coating may be CBN or diamond.

Figure 3:
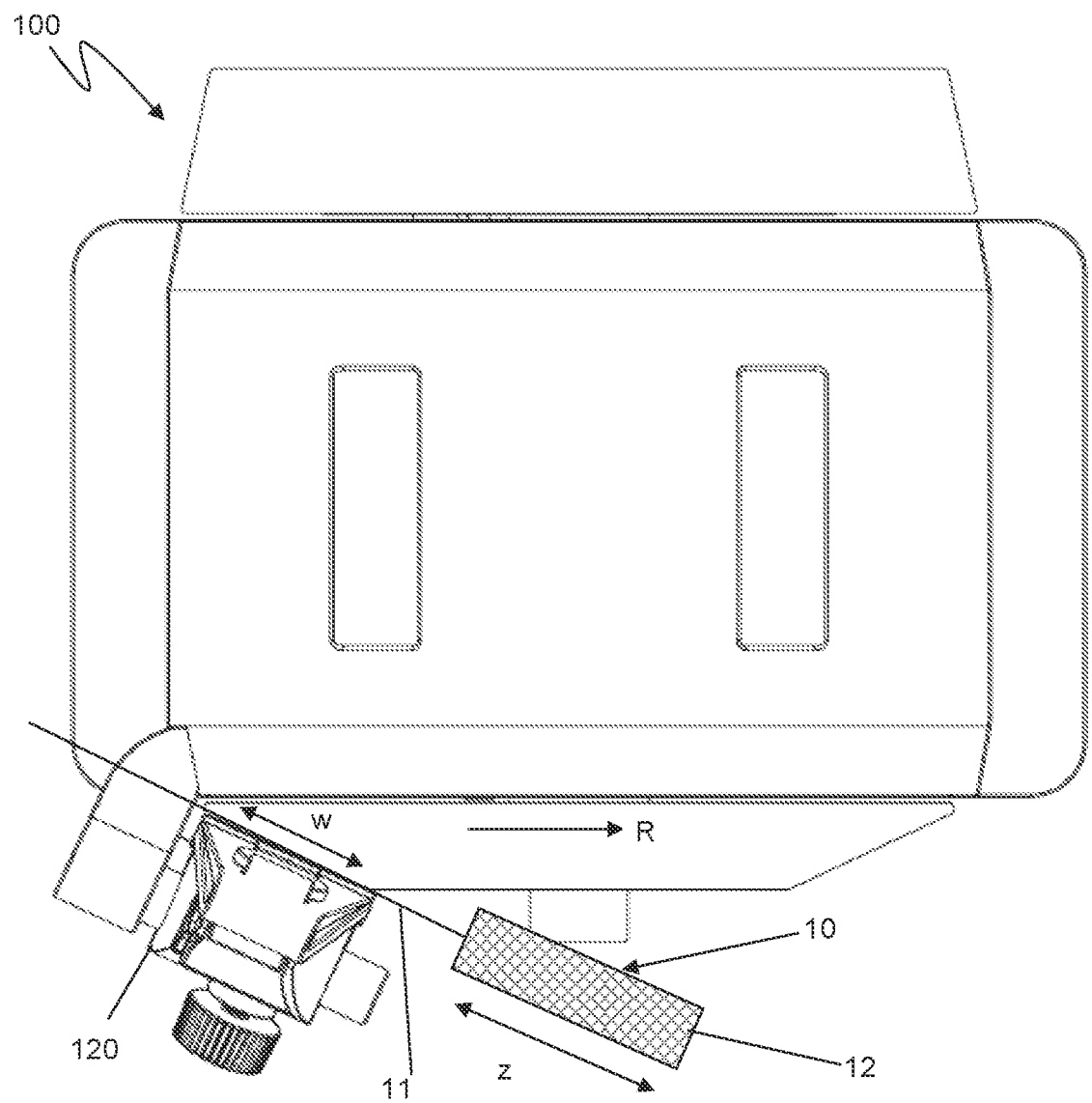
FIG. 3 is a top view of a grinding machine according to a second alternative of the present disclosure.

Further according to the first alternative of the present disclosure, the arrangement 50 for grinding edged tools 10 comprises a grinding jig 120 which is arranged such that, in use of the grinding machine, the edge of an edged tool 10 that is held by the grinding jig 120 extends over the envelope grinding surface 111 of the grinding wheel 110 and extends perpendicular to the rotational direction R of the grinding wheel. The grinding jig 120 may be configured to hold an edged tool in the form of a knife or a scissor. FIG. 3 shows, in a view from above, an edged tool 10 in the form of a knife with a blade 11 and a handle 12. The edged tool has a symmetric edge (not shown) with two opposing edge bevels. Edge bevels may also be denominated "grind bevels". It is possible that the edge has one single edge bevel. The edged tool is held by the grinding jig 120 perpendicular to the rotational direction R of the grinding wheel. The grinding jig 120 further holds the edged tool 10 such that the edge of the edged tool 10 is in a suitable (predetermined) angle against the grinding wheel. That is, such that the edge bevel is in a suitable angle against the grinding wheel.

Figure 2:
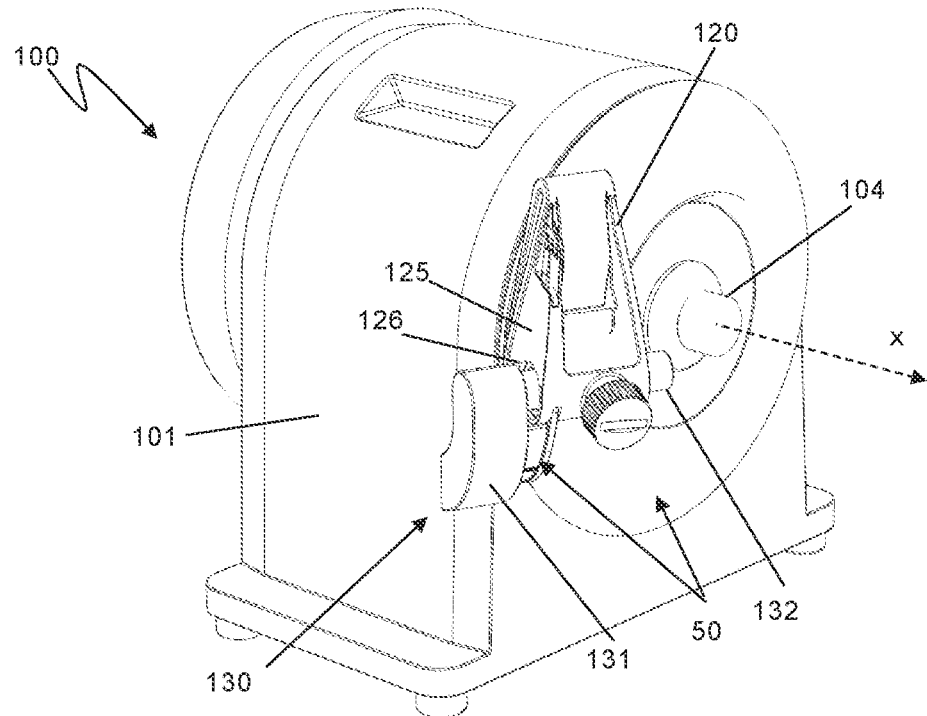
FIG. 2 is a perspective view from the right of a grinding machine according to a first alternative of the present disclosure.

Turning to FIG. 2, the arrangement 50 for grinding edged tools according to the first alternative of the present disclosure may comprise a support 130 for holding the grinding jig 120 over the envelope grinding surface 111. The support 130 comprises a first support arm 131 which may be attached to the housing 101 and extends at the side, i.e. next to the grinding wheel. The first support arm may thereby extends away from the housing 101, in direction parallel to or coinciding with the axis x of the output shaft 104 of the grinding machine.

The support 130 further comprises a second support arm 132 which extends from the first support arm 131 over the envelope surface and parallel thereto. Typically, the second support arm 132 extends perpendicular to the rotational direction R of the grinding wheel. The grinding jig 120 is supported on the second support arm 132. The grinding jig 120 thereby comprise a body 125 which comprises an opening 126 which is configured to receive the second support arm 132. The body 125 may be rotated on the second support arm (which may have circular cross-section) and locked into a selected angular position.

Returning to FIG. 1, the grinding jig 120 comprises a clamp 121 for holding an edged tool. The clamp may be clips-shaped and comprises a first and a second branch 122, 123 that are joined by a bend 124 in one ends. The other ends of the respective branches 122, 123 are free so that the branches may engage an edged tool and hold the tool between them. In case the edged tool is a knife the first and the second branch 122, 123 holds the back of the knife. The first and second branch 122, 123 extends laterally parallel with the grinding surface and perpendicular to the rotation direction. FIG. 3 shows the lateral extension W of the first and a second branch 122, 123.

The first, outer, branch 122 is biased towards second branch 123, which is supported by the body 125, so as to allow translating movement (i.e. back and forth) of an edged tool trough the clamp. Thus, the clamp is configured such that the first and second branch exerts sufficient force on the edged tool to hold it firmly, yet allows the translating movement through the clamp so that the edged tool can be sharpened over its full length. FIG. 3 indicates schematically translating movement of the edged tool 10 by the double arrow z.

The grinding jig 120 and the support 130 is further described in the Swedish Patent No. 538 902 which is herewith incorporated by reference.

Figure 4A:
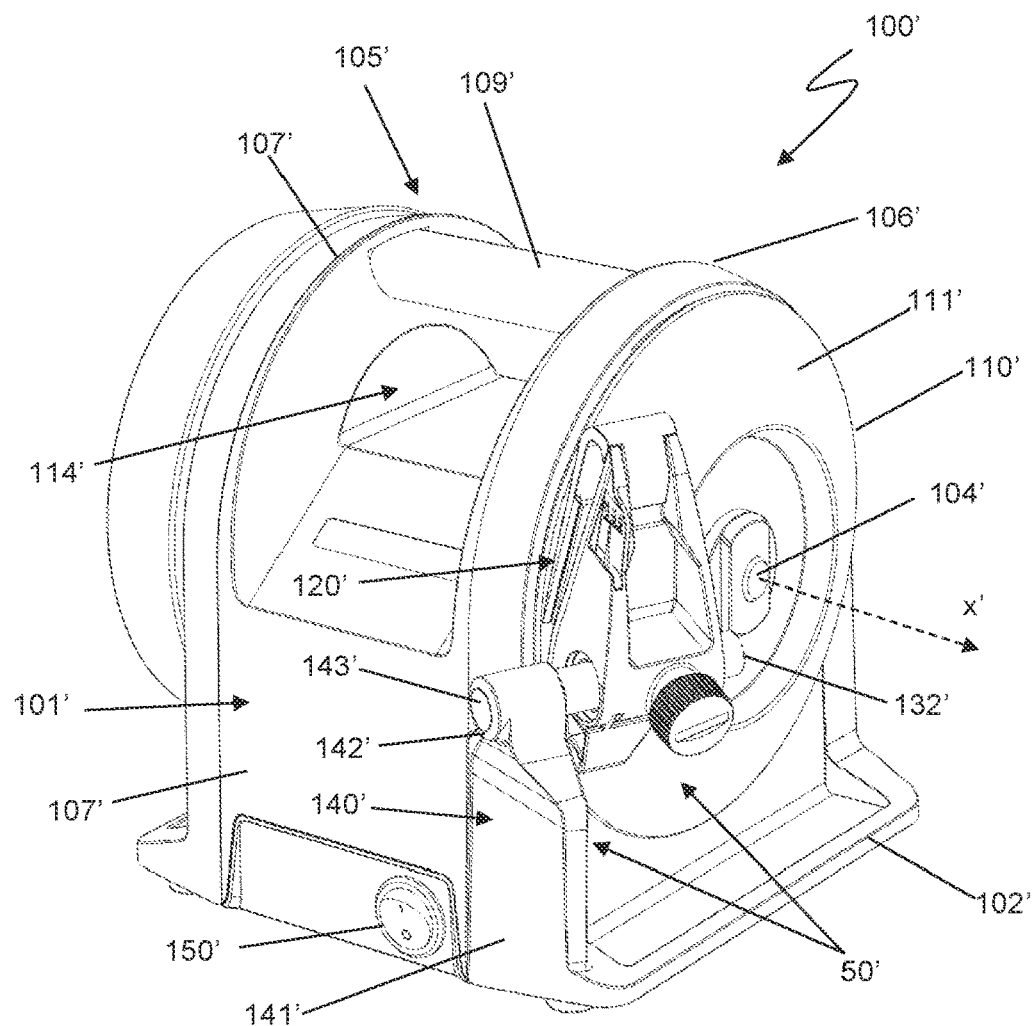
FIG. 4a is a perspective view from the right of a grinding machine according to a second alternative of the present disclosure.

FIG. 4a shows a grinding machine 100' according to a second alternative of the present disclosure. Several features of the grinding machine 100' according to the second alternative are identical to corresponding features of the grinding machine 100 according to the first alternative. Therefore, mainly differencing features will be described in detail hereinafter.

Thus the grinding machine 100' may comprise a lift handle 109' which is arranged in the top portion 105' of the housing 101'. The lift handle 109' extends between a front side 106' and rear side 107' of the housing 101'. A space 114' is located underneath the lift handle 109' in order to facilitate gripping thereof.

An actuator 150' for starting and stopping the motor 103' (not shown) of the grinding machine may conveniently be arranged on a side surface 107' of the housing 101'. The actuator 150' may be an on/off button.

The grinding machine 100' further comprises an arrangement 50' for grinding of edged tools according to a second alternative of the present disclosure. The arrangement 50' for grinding edged tools comprises a support 140' for holding a grinding jig 120' over the envelope grinding surface 111'. The grinding jig 120' is essentially identical to the grinding jig 120 of the arrangement 50 according to the first alternative. The support 140' comprises a support structure 141' which extends from the base 102' of the housing 101' at the side, i.e. next to, of the grinding wheel 110. The support structure 141' may thereby extend away from the housing 101, in direction parallel to or coinciding with the axis x' of the output shaft 104' of the grinding machine.

The support 140' further comprises a support arm 132' which extends from the support structure 141' over the envelope surface 111' of the grinding wheel 110' and parallel thereto. Typically, the support arm 132' extends perpendicular to the rotational direction R of the grinding wheel (see FIG. 1). The grinding jig 120' is supported on the second support arm 132'. The upper portion 142' of the support structure 141' may comprise an opening 143' for receiving an end of the support arm 132'. Alternatively, the support arm 132' may be attached to the support structure 141'.

Figure 4B:
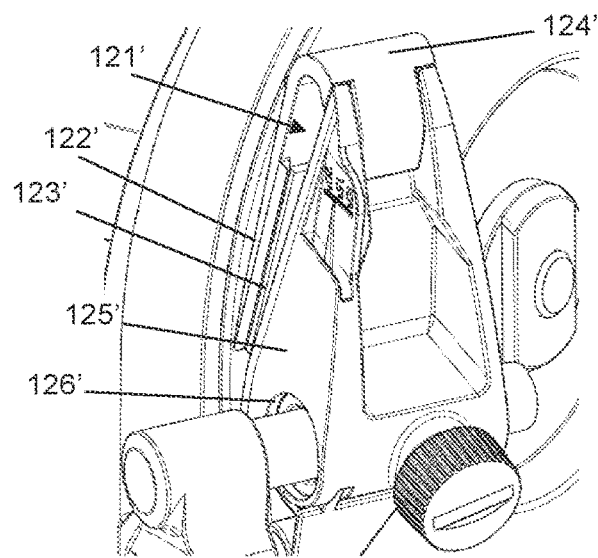
FIG. 4b is a portion of the grinding machine according to second alternative of the present disclosure.

The grinding jig 120' is shown in detail in FIG. 4b and comprises a body 125' which comprises an opening 126' which is configured to receive the support arm 132'. The body 125' may be rotated on the support arm 132' (which may have circular cross-section) and locked into a selected angular position. The grinding jig 120' further comprises a clamp 121', for holding an edged tool 10 (not shown). The clamp 121' comprises a first and a second branch 122', 123' which are joined by a bend 124'. As described under the first alternative of the alternative of the present disclosure, the first and the second branch 122',123' extends laterally parallel with the envelope grinding surface 111' and perpendicular to the rotational direction R of the grinding wheel.

Although a particular embodiment has been disclosed in detail this has been done for purpose of illustration only, and is not intended to be limiting. In particular it is contemplated that various substitutions, alterations and modifications may be made within the scope of the appended claims.

It is possible to combine the described alternatives.

Moreover, although specific terms may be employed herein, they are used in a generic and descriptive sense only and not for purposes of limitation. Furthermore, as used herein, the terms "comprise/comprises" or "include/includes" do not exclude the presence of other elements. Finally, reference signs in the claims are provided merely as a clarifying example and should not be construed as limiting the scope of the claims in any way.

What is claimed is:

1. An arrangement for grinding an edged tool, the arrangement being configured to be part of a grinding machine and comprising:
    a conical grinding wheel arranged to be rotated in a rotational direction and having an envelope grinding surface for the edged tool;
    a grinding jig for holding the edged tool, wherein the grinding jig, in use, is arranged such that the edged tool extends over the envelope grinding surface perpendicular to the rotational direction; and
    a support for holding the grinding jig, the support comprising either:
        i) a first support arm which extends at a side of the grinding wheel and a second support arm which extends from the first support arm parallel to the envelope grinding surface of the grinding wheel, wherein the grinding jig is supported on the second support arm, wherein the first support arm is attached to a housing of the grinding machine and extends at the side of the grinding wheel, and wherein the first support arm extends away from the housing in a direction parallel to or coinciding with an axis of the output shaft of the grinding machine, or
        ii) a support structure which extends at the side of the grinding wheel, and a support arm which extends from the support structure parallel to the envelope grinding surface of the grinding wheel, wherein the grinding jig is supported on the support arm, wherein the support structure extends from the base of the housing at the side of the grinding wheel, and wherein the support structure extends away from the housing in a direction parallel to or coinciding with the axis of the output shaft of the grinding machine.

2. The arrangement according to claim 1, wherein the grinding wheel is frusto-conical.

3. The arrangement according to claim 1, wherein the support structure extends from a base of the grinding machine.

4. The arrangement according to claim 1, wherein the grinding jig comprises a clamp for holding the edged tool.

5. The arrangement according to claim 4, wherein the clamp comprises a first and a second branch joined by a bend, and wherein the first and the second branch extend laterally parallel with the envelope grinding surface and perpendicular to the rotational direction of the grinding wheel.

6. The arrangement according to claim 5, wherein the first branch is biased towards the second branch so as to allow transverse movement of the edged tool through the clamp.

7. The arrangement according to claim 1, wherein the grinding wheel is made of metal with a super-abrasive coating comprising CBN or diamond.

8. The arrangement according to claim 1, where the edged tool comprises a knife.

9. A grinding machine for grinding an edged tool, the grinding machine comprising:
- a housing with a base for supporting the grinding machine on a surface;
- a motor; and
- an arrangement comprising:
  - a conical grinding wheel arranged to be rotated by the motor in a rotational direction and having an envelope grinding surface for the edged tool;
  - a grinding jig for holding the edged tool, wherein the grinding jig, in use, is arranged such that the edged tool extends over the envelope grinding surface perpendicular to the rotational direction; and
  - a support for holding the grinding jig, the support comprising either:
    i) a first support arm which extends at a side of the grinding wheel and a second support arm which extends from the first support arm parallel to the envelope grinding surface of the grinding wheel, wherein the grinding jig is supported on the second support arm, wherein the first support arm is attached to the housing and extends at the side of the grinding wheel wherein the first support arm extends away from the housing in a direction parallel to or coinciding with an axis of an output shaft of the grinding machine, or
    ii) a support structure which extends at the side of the grinding wheel, and a support arm which extends from the support structure parallel to the envelope grinding surface of the grinding wheel, wherein the grinding jig is supported on the support arm, wherein the support structure extends from the base of the housing at the side of the grinding wheel wherein the support structure extends away from the housing in a direction parallel to or coinciding with the axis of the output shaft of the grinding machine.

10. The grinding machine according to claim 9, further comprising a lift handle arranged in a top portion of the housing of the grinding machine and extending between a front side and a rear side of the housing.

11. The grinding machine according to claim 9, wherein the motor is connected to the output shaft of the grinding machine which runs through a center of the grinding wheel.

12. The grinding machine according to claim 9, where the edged tool comprises a knife.

13. The grinding machine according to claim 9, wherein the grinding wheel is frusto-conic al.

14. The grinding machine according to claim 9, wherein the support structure extends from a base of the grinding machine.

15. The grinding machine according to claim 9, wherein the grinding jig comprises a clamp for holding the edged tool.

16. The grinding machine according to claim 15, wherein the clamp comprises a first and a second branch joined by a bend, and wherein the first and the second branch extend laterally parallel with the envelope grinding surface and perpendicular to the rotational direction of the grinding wheel.

17. The grinding machine according to claim 16, wherein the first branch is biased towards the second branch so as to allow transverse movement of the edged tool through the clamp.

18. The grinding machine according to claim 9, wherein the grinding wheel is made of metal with a super-abrasive coating comprising CBN or diamond.

* * * * *